US008676402B1

(12) United States Patent
Foster

(10) Patent No.: US 8,676,402 B1
(45) Date of Patent: Mar. 18, 2014

(54) SENTRY SYSTEM WITH WIRELESS INTERFACE FOR A DOCKED BOAT

(71) Applicant: Stephen Foster, Wildwood, MO (US)

(72) Inventor: Stephen Foster, Wildwood, MO (US)

(*) Notice: Subject to any disclaimer, the term of this patent is extended or adjusted under 35 U.S.C. 154(b) by 0 days.

(21) Appl. No.: 14/018,584

(22) Filed: Sep. 5, 2013

Related U.S. Application Data

(63) Continuation of application No. 13/573,157, filed on Aug. 27, 2012.

(60) Provisional application No. 61/575,702, filed on Aug. 26, 2011.

(51) Int. Cl.
G05D 1/00 (2006.01)
B63C 1/08 (2006.01)
B63C 7/00 (2006.01)
B60L 3/00 (2006.01)

(52) U.S. Cl.
USPC .................. 701/2; 405/3; 114/44; 701/21

(58) Field of Classification Search
USPC .................. 701/2, 21; 405/3; 114/44
See application file for complete search history.

(56) References Cited

U.S. PATENT DOCUMENTS

| 4,763,592 | A | | 8/1988 | Russ .............................. 114/45 |
| 5,593,247 | A | * | 1/1997 | Endres et al. ..................... 405/3 |
| 5,725,402 | A | | 3/1998 | Marsh ............................ 440/53 |
| 6,264,513 | B1 | | 7/2001 | Marsh ............................ 440/53 |
| 6,866,092 | B1 | | 3/2005 | Molivadas ............... 165/104.21 |
| 7,152,769 | B2 | | 12/2006 | Johnston et al. ............... 224/324 |
| 7,207,746 | B1 | | 4/2007 | Legun .............................. 405/3 |
| 7,534,069 | B1 | | 5/2009 | Stanley ............................ 405/3 |
| 7,637,690 | B2 | | 12/2009 | Stanley ............................ 405/3 |
| 8,180,337 | B2 | | 5/2012 | Veliu et al. ..................... 455/420 |
| 8,196,899 | B2 | * | 6/2012 | Hager ........................... 254/343 |
| 8,216,007 | B2 | | 7/2012 | Moore ............................ 440/1 |
| 2005/0183648 | A1 | * | 8/2005 | Basta ............................. 114/44 |
| 2008/0120639 | A1 | | 5/2008 | Walter et al. |
| 2008/0306642 | A1 | * | 12/2008 | Figura et al. .................... 701/21 |
| 2009/0220300 | A1 | * | 9/2009 | Stanley ............................ 405/3 |
| 2011/0302050 | A1 | | 12/2011 | Kildevaeld |
| 2012/0057782 | A1 | | 3/2012 | Bick |

OTHER PUBLICATIONS

White River Flow Information, Bull Shoals and NorFork Reservoir pool level forecasts, and dam generation. http://www.hisplaceresort.net/River-flow.htm Accessed Aug. 27, 2012.

* cited by examiner

*Primary Examiner* — Thomas Black
*Assistant Examiner* — Tyler Paige
(74) *Attorney, Agent, or Firm* — Jonathan A. Bay

(57) ABSTRACT

An electric sentry system provides utilities for the welfare of a docked boat. The sentry system serves as boat and lift control, and security, system that has a wireless interface for two-way communications with a mobile wireless device. The system is configured to receive commands sent from the mobile wireless device. The system is also configured to independently monitor conditions involving the boat, the lift, or the premises surrounding the docked boat slip, and provide notifications to the boat owner/relevant user upon the occurrence of certain report-worthy events. This includes having the system monitoring online sources for extreme weather and/or other climatic data.

20 Claims, 12 Drawing Sheets

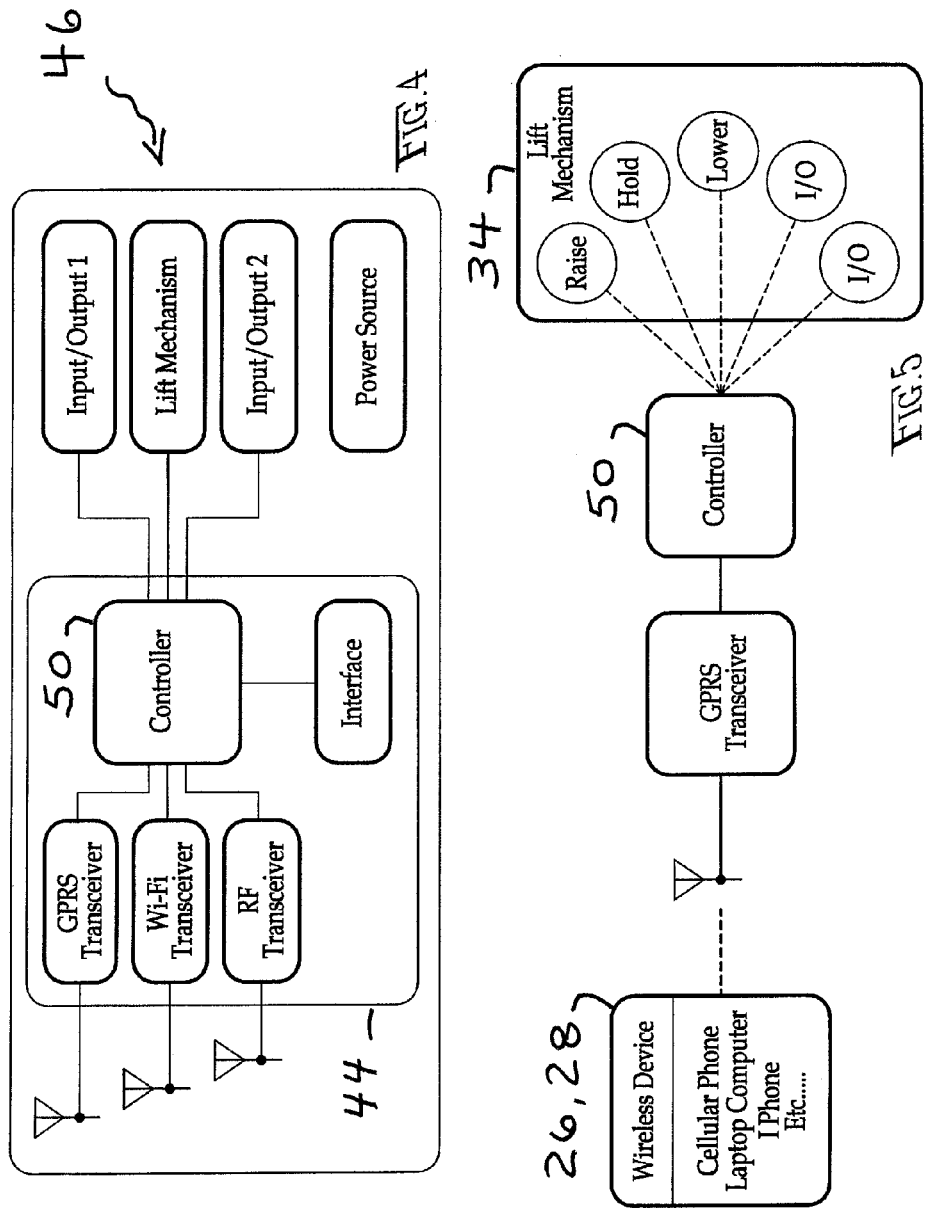

SENTRY SYSTEM WITH WIRELESS INTERFACE FOR A DOCKED BOAT

CROSS-REFERENCE TO PROVISIONAL APPLICATION(S)

This application is a Continuation of U.S. patent application Ser. No. 13/573,157, filed Aug. 27, 2012, which claims the benefit of U.S. Provisional Application No. 61/575,702, filed Aug. 26, 2011, the disclosure of which is incorporated herein by this reference thereto.

BACKGROUND OF THE INVENTION

1. Field of the Invention

The invention relates to an electric sentry system for a docked boat and, more particularly, to a boat and lift control and security system that has a wireless interface for two-way communications with mobile wireless devices. The inventive system is configured not only to receive commands sent from a mobile wireless device but also to independently monitor conditions involving the boat, the lift, or the premises surrounding the boat slip, as well as monitor online sources of weather and/or climatic data, and then in consequence propagate messages to the mobile device of the relevant user/boat owner with the results of such monitoring activities.

2. Prior Art

Pleasure boats are luxury ticket items. It is hard for the budget-minded to cost justify a pleasure boat. Still, boat ownership is popular. People are willing to endure a certain amount of financial stress for the luxury of owning a pleasure boat.

Nevertheless, a pleasure boat is a piece of property which is typically left unattended for long periods of time, often in environments where it is vulnerable to misfortune. This problem has always been a bit worrying for the owners of pleasure boats.

There is no uniform profile of the owner of a pleasure boat who rents or owns a slip or a dock for the storage of his or her boat. But many such boat owners are highly 'absentee.' That is, they live a substantially long drive away from their boat slip. They own and use their boat for lifestyle, and not work. In consequence, they have to leave their boat unattended in the boat slip—elevated on the boat lift or not—for substantial periods of time.

A typical boat owner of this type might only get to spend a fraction of a season's time in actual, in-person contact with his or her boat. The thought of what misfortunes could befall the boat while unattended is indeed, as said before, worrying.

What is needed is a sentry system for a docked boat and/or boat lift which can perform control and/or security functions for the long-absent boat owner, as well as hold two-way communications with a mobile wireless device.

SUMMARY OF THE INVENTION

It is an object of the invention to provide an electric-powered sentry system for a docked boat, which sentry system also has a wireless interface for two-way communications with a remote, mobile wireless device.

It is another object of the invention that the boat owner can authorize others to use the system through their own mobile wireless device.

It is an alternate object of the invention to provide a user of a mobile wireless device with the opportunity to send the boat, the boat lift, and/or the premise-monitoring security system such communications that might comprise control instructions for functions and/or comprise requests for reports.

It is a further object of the invention to configure the system to not only monitor numerous conditions but also to send messages to the mobile wireless device of the relevant user/boat owner, which messages might comprise any of status reports, security messages, alerts, requests for instruction and so on.

It is still another object of the invention to comfort the relevant user/boat owner that he or she has a virtual guardian angel watching over the docked boat while he or she is far away by virtue of the inventive sentry system in accordance with the invention.

It is still a further object of the invention to provide the boat owner/relevant user with warnings or notifications of any security or failure issues, including theft and/or extreme weather. Such warning or notification messages of prospective, future potential harm could give the owner/user enough advance time to undertake protective measures.

It is moreover another object of the invention to provide a platform interdependent two-way wireless remote solution that is (1) capable of unlimited range for remote operation, (2) of a single one or else even multiple such boat and lift control and security systems in accordance with the invention, and (3) capable of integrating remote functionality within multiple wireless devices such as a cell phone via a standalone or browser-based application interface.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 4 is a block diagram of the system's control electronics in accordance with the invention, and comprising an array of alternative interfaces for communications across alternative wireless communications networks;

FIG. 5 is a block diagram of the system's control electronics of FIG. 4 (with portions broken away) furthermore shown in two-way communications with a remote, mobile wireless device of the prior art;

FIG. 9 is a block diagram comparable to FIGS. 7 and 8 except showing the conditions monitored by the boat and lift control and security system in accordance with the invention in connection with online sources of information regarding lake levels, weather and the like;

DETAILED DESCRIPTION OF THE PREFERRED EMBODIMENTS

Figure 1:
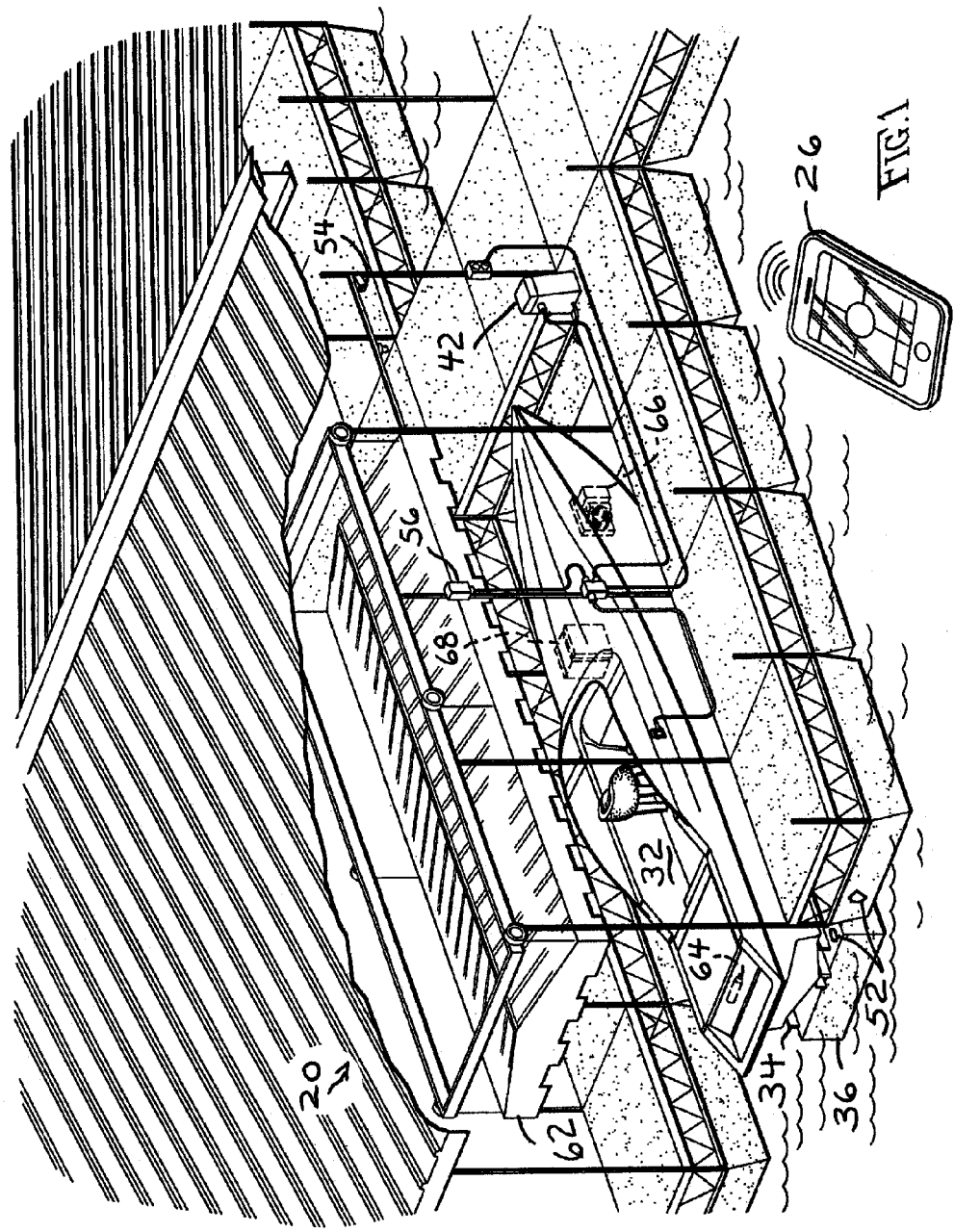
FIG. 1 is a perspective view of a boat and lift control and security system in accordance with the invention that has two-way communications capability with a remote, mobile wireless device of the prior art.

FIG. 1 shows a boat and lift 32 and 34 control and security system 20 in accordance with the invention that has two-way communications capability with a remote, mobile wireless device 26 of the prior art. The system 20 serves as an electric sentry for a docked boat 32, especially during for extended periods of time the boat 32 when the boat owner has simply had to leave the boating life behind and return to the work world, perhaps many hours drive away.

Preferably the boat 32 is stored on an out-of-the-water boat lift 34. By way of non-limiting example, the boat lift 34 depicted in the drawings is a pneumatic (eg., air) lift. The boat lift 34 comprises an air tank 36 that is pumped with air to lift and support the weight of the boat 32 out of the water. In the reverse, air is vented out of the tank 36 to sink the tank 36 and hence return the boat 32 back to floating freely on the water. The typical purpose of a boat lift 34 is to safely elevate the boat 32 out of the water, which helps in various ways with protecting and preserving the life of the boat 32.

There are numerous other boat lift designs. Aside from air lifts, there are also hydraulic boat lifts, and then there are winch designs, cradle designs, davit designs, elevator designs, and, so on.

Some boat lifts are powered by human muscle-power but, especially for larger boats, most are power-operated. The boat lift 34 of FIG. 1 is powered by electric power fed to an equipment cabinet 42, which is shown better in FIG. 3. The boat lift 34 might have alternative electric power sources, such as public utility power, solar electric power or electric battery power and the like. Typically, power-operated boat lifts of the prior art have manually-actuated switches or buttons on the equipment cabinet 42 which are, needless to say, 'manually' toggled or depressed in order to operate the boat lift.

In other words, the owner/relevant user typically has to be there in-person and/or within the range of a key fob to operate the boat lift.

However, it is an aspect of the invention to allow a user send such control instructions to the boat lift 34 by way of two-way communications with a remote, mobile wireless device 26 from far distant ranges than possible with prior art systems.

Figure 3:
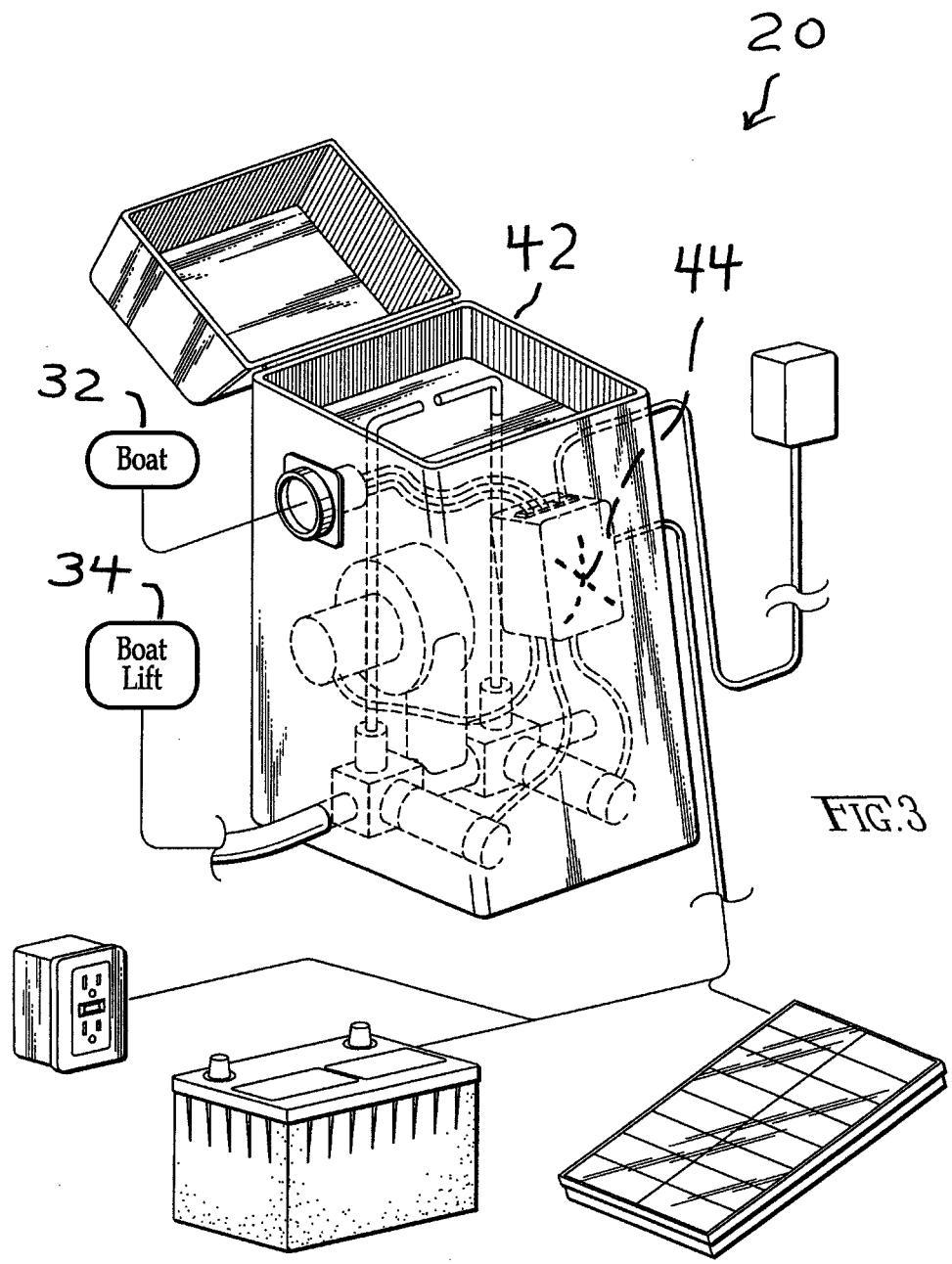
FIG. 3 is an enlarged-scale perspective view of the boat-lift control cabinet of FIG. 1, and which view further shows an array of alternative electric power sources.

To turn to FIG. 3, the boat lift 34's equipment cabinet 42 encloses an air blower, air hoses to one or more submersible air tank(s) 36, and the control electronics 46 therefor. It is an aspect of the invention to enable a user to give instructions such as "RAISE" the lift 34 or "LOWER" the lift 34 via mobile wireless devices 26 or 28 such as a cellular telephone 26 or laptop computer 28 and so on.

Figure 2:
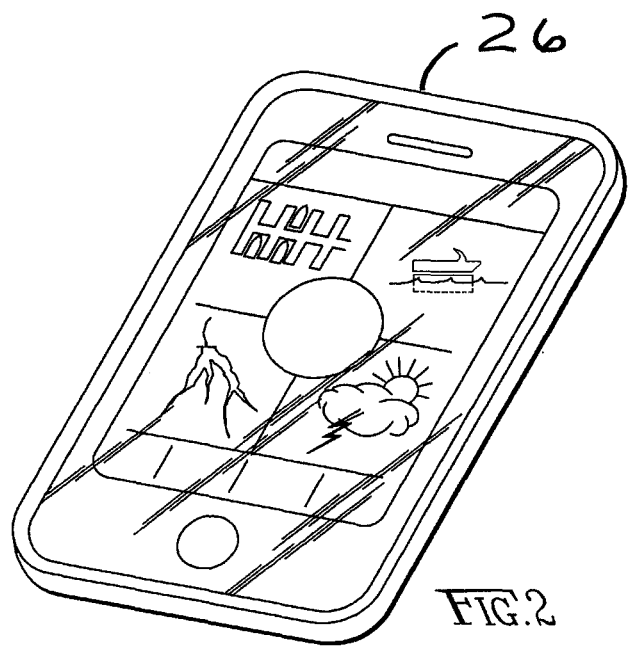
FIG. 2 is an enlarged-scale perspective view of the mobile wireless device of the prior art in FIG. 1, as configured for two-way communications with the boat and lift control and security system in accordance with the invention.

FIG. 2 shows that the preferred mobile wireless device 26 comprises a cellular telephone including, without exclusion of other kinds of mobile wireless devices, a smart phone. Returning to FIG. 3, the equipment cabinet 42 further encloses a housing 44 which houses the control electronics 46 for the boat and lift 32 and 34 control and security system 20 in accordance with the invention, along with the wireless interface therefor. FIGS. 4 and 5 show better that the control electronics 46 comprise a central controller 50. Among other capabilities of the controller 50, it regulates the flow of high-volume low-pressure air to and from the air tank(s) 36.

To turn to FIG. 2, the display of the smart phone is divided into four quarters according to an operations protocol in accordance with the invention. One quarter of the screen can be designated as allowing the user to access the air lift controls 46 and 50. FIGS. 4 and 5 show that the central controller 50 is linked to various two-way communications technologies to receives the instructions messages of the user's mobile wireless device 26.

With general reference to FIGS. 1 through 5, a user can lift the boat 32 out of the water by sending a control command from the mobile wireless device 26 to switch the air blower to "ON." The boat lift 34 operates automatically until the fully out-of-the-water position is reached, then the air blower is automatically switched to "OFF." To lower the lift 34, the user accesses another control command through his mobile wireless device 26. This time, the blower remains "OFF," and a vent is opened to allow the escape of air from the air tank(s) 36. The central controller 50 can draw its power from several optional sources of electric power, as shown in FIG. 3.

The controller 50 can also be designed to integrate and operate with alternative types of lifts where manual operation can be replaced by operation by a mobile wireless device 26:—hydraulic, electric winch, cradle (overhead), elevator, or some other electric actuated boat lift.

Referring to FIG. 3, the equipment cabinet 42 comprises a UV-resistant housing 44 capable of containing:—
  one or a plurality of high-volume low-pressure air blowers,
  one or a plurality of electric actuated valves,
  appropriate GFCI-protected wiring connected to an external power source,
  a NEMA-grade housing 44 for the controller/transceivers,
  and so on.

Referring to FIG. 4, the electronic controls includes the central controller 50, memory, a general packet radio service (GPRS) transceiver, a first antenna associated with the GPRS transceiver, a Wi-Fi enabled transceiver, a second antenna associated with the Wi-Fi transceiver, an RF transceiver, a third antenna associated with a RF transceiver, an interface, a power source, an output line to a relay for the actuation of the valves for the pressurized air lines, and a plurality of other input and output lines for other sensors and/or devices.

For example, three additional inputs might be from position detectors 52 on three of the four corners of the lift 34 (or, as illustrated, the lift 34's single and rectangular air tank 36). That way, the three position detectors 52 could detect if the lift 34 were fully submerged, fully raised, some stage in between, or else also askew. The determination if the lift 34 is "RAISED" or "LOWERED" can be managed in a number of ways. The controller 50 can record each actuation. The assumption is, if the last actuation was "RAISE," then the air tank 36 did not leak and sink and, therefore, the lift 34 is fully elevated.

Preferably, the position detectors 52 comprise a range-finding unit on the dock measuring the distance away a target is on the air tank 36. However, position detection can be obtained as easily by limit switches or else by a float. That is, a ball float on a rod, pivoted at one end on the tank, the other end floating on the surface. If the rod is long enough, the angle of the rod to level will correspond to the depth of the air tank 36.

Alternatively, the controller 50 might be linked to a camera 54 pointed at the slip. The user can request the controller 50 to send an image of the slip. The controller 50 might take a picture and transmit the picture in high resolution. Then the user can determine if the lift 34 is "RAISED" or "LOWERED." To minimize the size of the transmission of the picture, the controller 50 might utilize artificial imaging such as outline imaging of a stylized depiction of the boat 32 in either the "RAISED" or "LOWERED" position.

Another option might be, as described above, the three position detectors 52. They can detect if the lift 34 were fully submerged, fully raised, some stage in between, or else also askew. Moreover, the controller 50 might continuously sample the outputs of the three position detectors 52. They could be sensitive enough to detect rocking due to high waves, perhaps even detect rocking due to a person entering the boat 32, and then send a picture and alarm signal of such.

The controller 50 can be either a custom digital integrated circuit or a standard commercial off-the-shelf processor. The operations of the system 20 in accordance with the invention can be controlled by two or more controllers working in cooperation (this is not shown). The controller 50's memory stores the operating instructions, application software, read/write data and so on.

The GPRS transceiver includes circuitry for transmitting and receiving communications via the first antenna. The GPRS transceiver includes chipsets for conditioning signals according to the GRPS protocol. GPRS shares cellular phone channels and communicates data via a cellular telephone network. A cell tower must be in the range of a transceiver to allow the circuit to transmit and receive communications through the cellular network. The GPRS transceiver communicates according to a cellular telephone protocol, and cellular protocols other than GPRS may be used including analog, digital, and third generation protocols.

The circuitry for the Wi-Fi transceiver as well as the RF transceiver are designed in similar fashion as the GPRS transceiver in that they send and receive communications through their respective Wi-Fi antenna and RF antenna. The Wi-Fi transceiver and RF transceiver provide communications via their respective wireless protocols to the controller 50.

It is appreciated that GPRS transceiver, Wi-Fi transceiver, and RF transceiver can either be associated with a single controller 50—which eliminates the need to have a dedicated controller and memory element for each transceiver interface—or can have their own dedicated controller and memory element for each transceiver interface (this is not shown).

Figure 6:
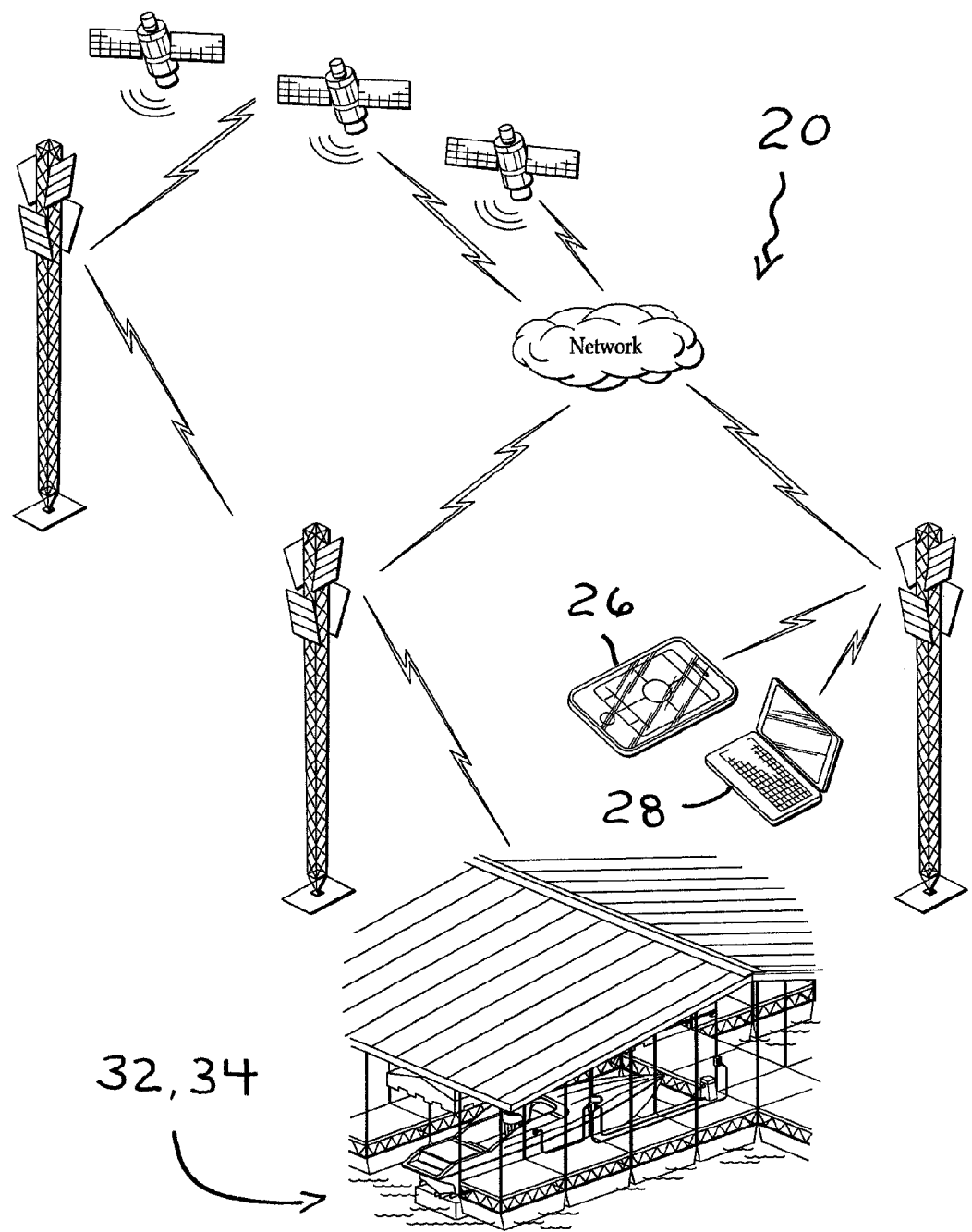
FIG. 6 is a schematic diagram of a GPRS wireless communications network and/or a Wi-Fi/Internet-oriented communications network for transmission of the two-way communications between the mobile wireless device of the prior art and the boat and lift control and security system in accordance with the invention.

FIGS. 1, 5 and 6 show a mobile wireless device 26 or 28 communicating with the electric sentry system 20 in accordance with the invention over a GPRS cellular network. A cross-browser application design is used to avoid any inter-dependency issues usually associated with standalone applications across multiple proprietary mobile hardware platforms (eg., iPhone, Android and so on) or wireless laptop computer (eg., Apple iPad, Mac, Microsoft PC, Open Source and the like). If the user accidentally drops his or her cell phone in the water, it is an aspect of the invention that communications can be sent and received over an alternate cell phone or wireless laptop computer by means of an account login and password. Additionally, preferably the equipment cabinet has a control panel (not shown) with a keypad or the like so that authorized users can manually override the system and regain control in the event of the sole mobile wireless device is lost. It is another aspect of the invention that the design of the user-interface application can be a specific stand-alone application designed to work on a specific model of a mobile wireless handset or a specific model of a wireless laptop computer.

FIG. 6 furthermore shows that the communications can alternatively travel over Wi-Fi and/or wireless Internet connection. Wi-Fi and/or Internet connection networks readily handle transmission of image and video media better than cell phone networks.

Indeed, it is an aspect of the invention to prefer a cellular wireless network because cellular coverage is so extensive across the country these days. However, cellular transmission protocols work best with transmissions of relatively small bandwidth. In consequence, it is preferred that the transmission be actually very small in nature. Preferably, the transmissions are encoded by some compression routine, sent across the cellular network, and then decoded on the receiving side by an application both on the controller 50 and the mobile wireless device 26.

Wi-Fi and Internet connections allow communications of much greater bandwidth. It is eventually believed that Wi-Fi and/or Internet connections to boat slips will be commonplace. It is expected it will be commonplace for marinas to install wireless routers for the good of the slip-owning/leasing community as a whole.

Both cellular networks and Wi-Fi/Internet connections are vulnerable to the most extreme weather, for example, hurricanes. The most extreme weather will take out cell towers, black out public utility power, and otherwise render the controller 50 unable to communicate across either by cell transmission or Wi-Fi/Internet connection. However, if the controller 50 has a battery back-up power, it has one last communications link available to it, namely, a short wave radio link (or other radio spectrum). This gives the controller 50 the ability to continue communications in the event that traditional shore power is out or the cell towers are disabled.

Pause can be taken to return back to FIG. 1. It is an aspect of the invention to configure the electric sentry system 20 with a wireless interface for attending to a docked boat 32 for a variety of different purposes.

In other words, the electric sentry system 20 is configured to devote all the its attention to the boat owner's cherished piece of expensive property (ie., the boat 32). The owner has probably too much money tied up in the boat 32 for the amount of time that he or she gets to enjoy it. The electric sentry system 20 in accordance with the invention provides numerous conveniences for the boat owner as well as helps look after the boat 32 while the owner is away and distracted with other things in life to constantly fret over the boat 32.

The electric sentry system 20 is designed not only to respond to instructions but also to independently generate and propagate reports and/or alarms, request instructions, even in certain cases to act independently.

Figure 7:
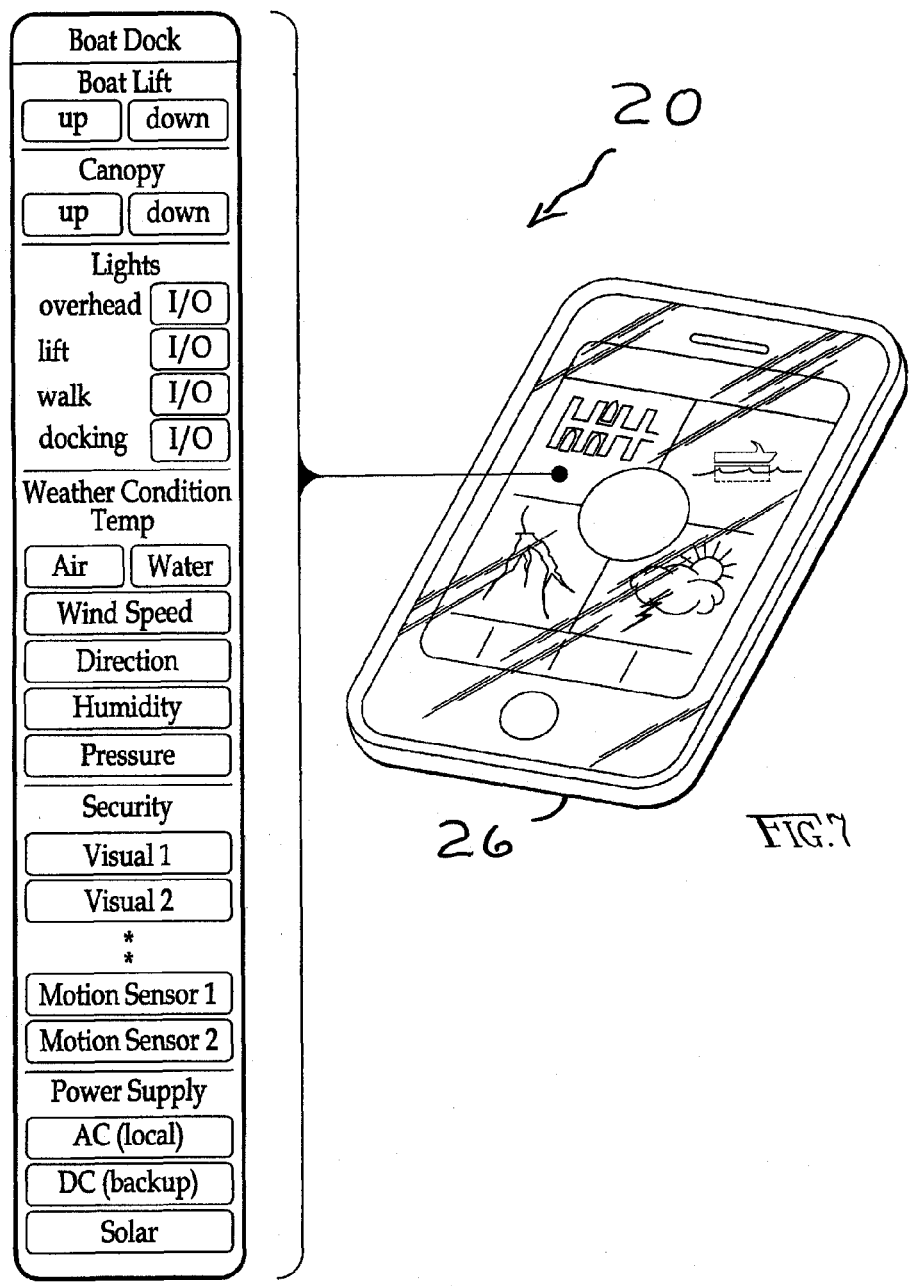
FIG. 7 is a block diagram showing the functions and conditions controlled and monitored by the boat and lift control and security system in accordance with the invention in connection with the dock premises.

FIG. 1 taken together with FIG. 7 show in part that the system 20's controller 50 is preferably linked to the following detectors in and around the boat dock:—
- the position detectors 52 for the lift 34,
- a GPS receiver to provide:
  - water level (including tide level),
  - homing coordinates for the boater to return to,
- water temperature,
- depth locator,
- a compact weather station 56 to provide:
  - air temperature,
  - barometric pressure,
  - humidity,
  - wind speed,
  - wind direction,
- camera 54, for both video and still images,
- motion sensor(s) 54,
- smoke detectors,
- tension in the hoisting cables of a cabled boat lift (if applicable),
- weight of the boat 32 on a mechanical lift (if applicable), and so on.

FIGS. 1 and 7 show in part that the system 20's controller 50 is preferably linked to send control signals to the following devices in and around the boat dock to switch them "ON" and "OFF" or otherwise operate them:—
- the lift 34,
- a canopy 62,
- the camera 54,
- lighting,
- power source management, and so on.

The provision of the GPS coordinates of the boat slip serves as convenient navigational guide/compass to boat owners (or the authorized user) who get lost on the water and can't remember how to get back.

Figure 8:
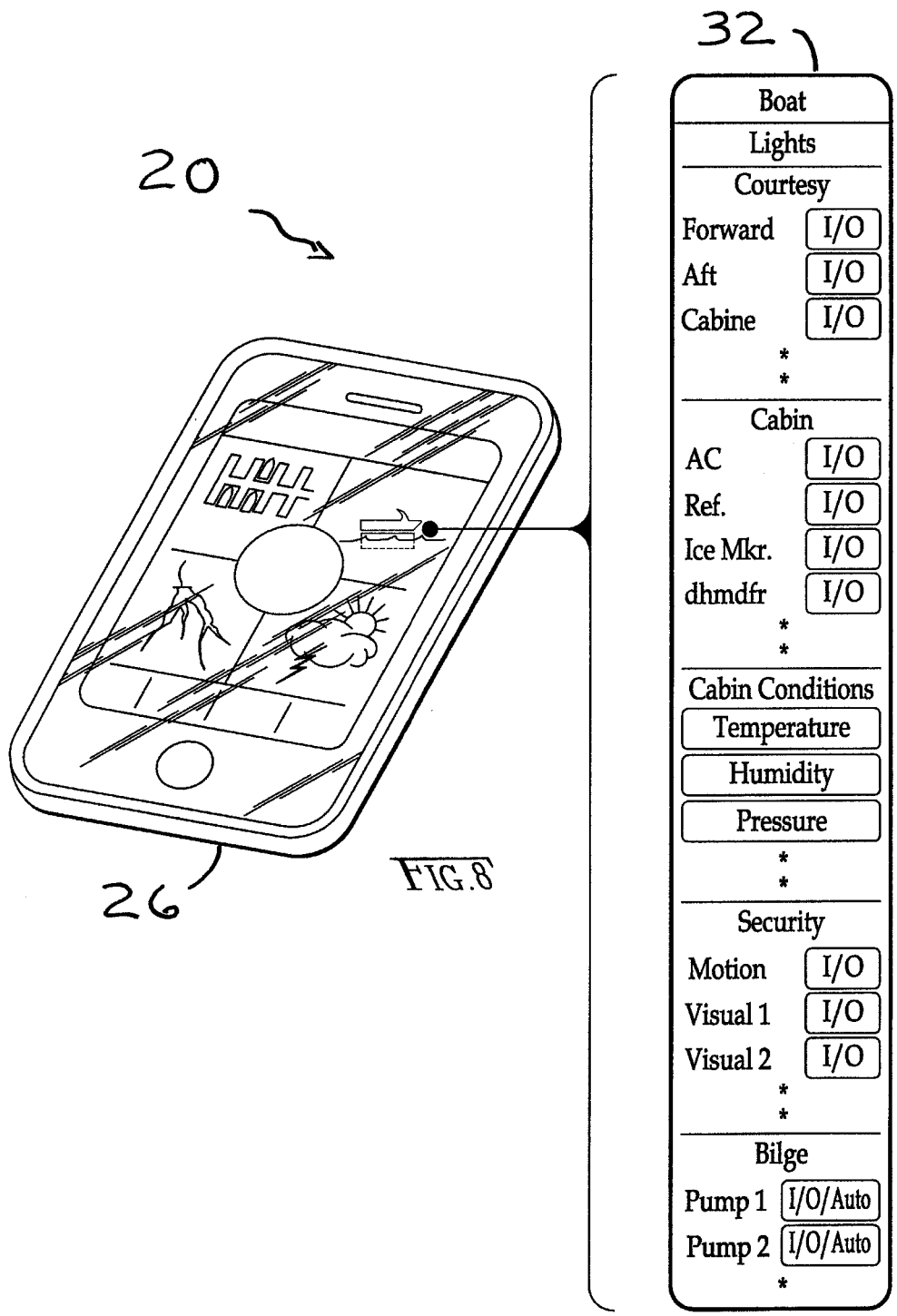
FIG. 8 is a block diagram comparable to FIG. 7 except showing the functions and conditions controlled and monitored by the boat and lift control and security system in accordance with the invention in connection with the boat itself.

FIG. 1 taken together with FIG. 8 show in part that the system 20's controller 50 is preferably linked to the following detectors in and around the boat 32 itself:—
- cabin humidity,
- cabin temperature,
- engine compartment temperature,
- a fuel vapor sensor in the engine compartment,
- smoke detector(s),
- cabin door/window/hatch/access entry detectors,
- automatic actuation of a bilge pump,
- automatic actuation of an engine compartment blower,
- automatic actuation of a fire extinguisher 64, and so on.

FIGS. 1 and 8 show in part that the system 20's controller 50 is preferably linked to send control signals to the following devices in and around the boat 32 itself to switch them "ON" and "OFF" or otherwise operate them:—
- cabin air conditioner 66,
- cabin heater,
- refrigerator/ice maker 68,
- cabin dehumidifier,
- lighting,
- bilge pump,
- engine compartment blower,
- engine compartment heater (eg., a marine version, w/o relays),
- fire extinguisher 64, and so on.

Figure 9:
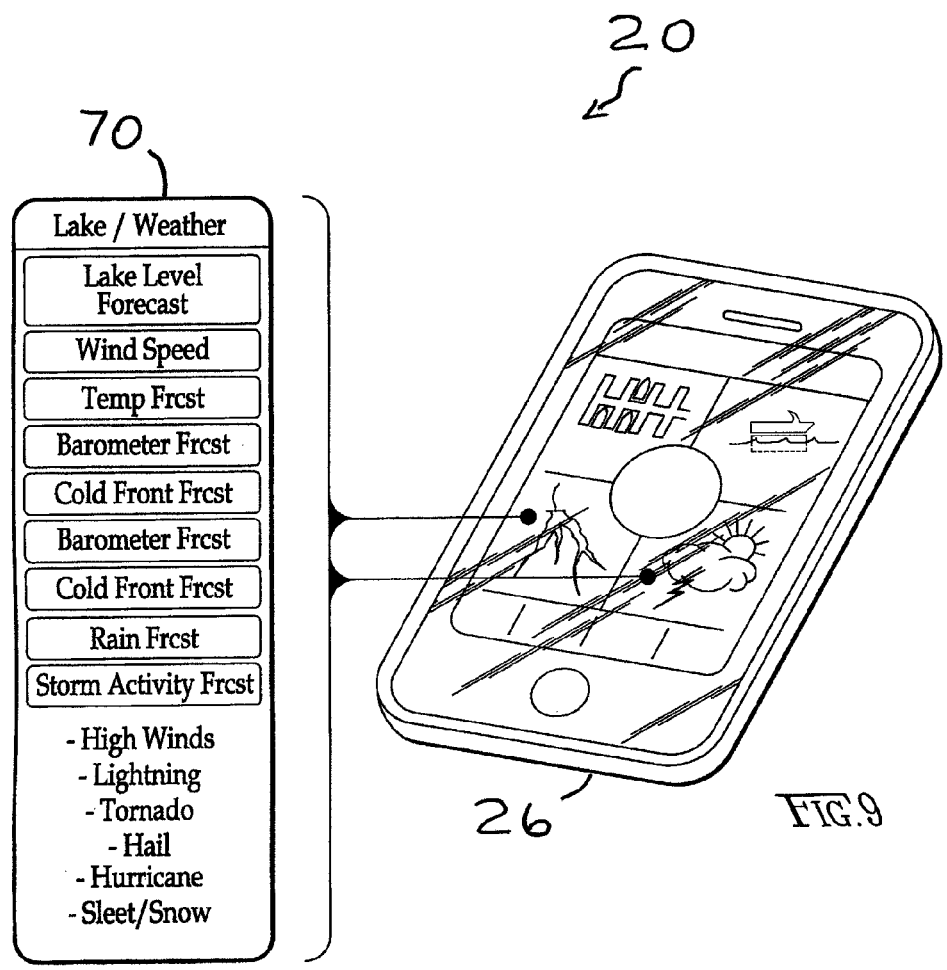

FIG. 1 taken together with FIG. 9 show in part that the system 20's controller 50 is preferably monitoring online sources 70 for optionally the following kinds of information:—
- for a lake or reservoir,
  - pool level,
  - forecast changes thereto,
- for a river,
  - water level,
  - forecast changes thereto,
- for coastal water,
  - sea level,
  - forecast tidal changes thereto,
- water temperatures,
- wind speed,
- weather and/or climatic forecasts, including
  - cold front forecast,
  - temperature forecast,
  - barometer forecast, precipitation forecast,
  - thunderstorm forecast,
  - high wind forecast,
  - hail forecast,
  - tornado forecast,
  - hurricane forecast,
  - snow forecast, and so on.

It is a preferred mode of operation that the electronic sentry system 20 is periodically sampling (1) the status or state of at least one chosen condition of the docked boat 32 and (2) data from at least one online source regarding some factor that could prospectively impact the docked boat.

An example chosen condition of the docked boat comprises the water depth under the dock. An example factor that the sentry system 20 is going to search online data for the welfare of the boat 32 and that is related to water depth under the dock is the forecast of a rise and/or fall in the level of the waterway. The alarm condition would be that the water levels are low, and predicted to falling even lower, that the dock and/or boat 32 are at risk of being marooned on the bottom of a dry lake bed.

The sentry system 20 would execute an algorithm on the sampled status or state of the chosen condition of the docked boat in comparison to the sampled data from the at least one online source, and then thereafter determine if an alert condition has been met. If so, the sentry system generates and transmits an alert communication to the wireless mobile device 26 of the remote user.

There are indeed online sources which provide forecasts of waterway levels. Indeed, for any given waterway, there might be multiple sources that have to be checked. An online article explaining what the resources are for a pair of mid-western reservoirs and the river which they both flow into includes this one entitled "White River Flow Information, Bull Shoals and NorFork Reservoir pool level forecasts, and dam generation," accessed online at http://www.hisplaceresort.net/Riverflow.htm on Aug. 27, 2012.

The process is fairly elaborate and, like weather forecasts, pool level forecasts three days ahead of time are better than ten-day out forecasts. Not only that, but there is not just one governmental entity responsible for pool levels. For Bull Shoals, pool elevations between 654 feet and 695 feet are called flood pool, and the U.S. Army Corps of Engineers are in control. They will hold back and/or release water, primarily focusing on flood control needs. The Corps will hold back the water as much as possible to prevent flooding in this area.

From 628.5 to 654 feet, the pool level is defined as the Power Pool. Between these levels, the Southwestern Power Administration (a division of the U.S. Department of Energy) is in control of the water. They use this water at their discretion. And they use it to generate power through any of the eight generators at Bull Shoals Dam. Computers in Oklahoma (hundreds of miles away) decide when to run water, and how much. Their primary market is selling power at peak demand times. Moreover, the electricity can be distributed over a large portion of the U.S.

Pause can be taken now to return to what opportunities the electric sentry system 20 for a docked boat 32 affords the boat owner/authorized user. Such opportunities include the following.

The boat 32 can be "RAISED" or "LOWERED" on the lift 34 with the owner being in a different time zone. For instance, late in the season, a cold front will pass through a lake community with the temperatures well below freezing. However, the water temperature might still be dozens of degrees above freezing yet. It is an old trick to extend the season for the boat 32, and not prematurely winterize it, to "LOWER" the lift 34 and submerge the boat 32's hull in the water. That way, the warmer water temperature keeps the engine compartment above freezing despite the freezing air temperatures.

Moreover, as the boat owner starts his or her commute to the boat 32, he or she can switch "ON" the air conditioner 66, refrigerator 68, and/or ice maker about an hour before arrival so that the cabin is comfortable when he or she has arrived.

The system 20 continually monitors its detectors 52 et al. and/or online sources 70 of information for the safety of the boat 32. That is, it is an object of the invention to safeguard the boat 32 and/or provide alerts regarding the following categories of threats:—
    malfunction threats,
    weather/climatic threats,
    intruder threats, and so on.
    Malfunction threats include that:—
    the lift 34 has sunk,
    the boat 32 is too heavy for the lift 34 (ie., someone forgot to dump the ballast),
    the boat lift 34 is abnormally listing or pitched or else tipped to one corner,
    the bilge pump does not work,
    the engine compartment heater does not work,
    the engine compartment air blower runs too much,
    the engine compartment fuel vapor levels are too high, and so on.

That is, the system 20's controller 50 periodically monitors its detectors for a malfunction event. For example, if the owner decides to intentionally leave the boat 32 sitting in the water, the system 20's controller 50 can periodically attempt to switch the bilge pump "ON" to test if it works. Malfunction events are pre-defined in connection with each sensor in connection with what constitutes a trigger event. Given whenever a trigger event occurs, the electric sentry system 20 in accordance with the invention propagates a message (which is also likely pre-defined) to the wireless mobile device of the boat owner/authorized user.

Indeed, the electric sentry system 20 is preferably programmed (1) continually call the one device of the boat owner until a response is received, or else, (2) poll through a list of alternative numbers and/or addresses until at least one polled device responds.

Whenever any one starts to respond the malfunction event, they can manually take control of the situation. They can request images and/or video of the slip. If the boat lift 34 is listing dangerously, they can order the instruction that the boat lift 34 just be "LOWERED" all the way. If the bilge pump is not working, they can order the instruction that the boat lift 34 be "RAISED" all the way, and so on. The boat owner/authorized user can issue instructions which best serve a remedial action purpose, to the extent possible.

Weather and/or climatic threats include numerous things:—
    freezing temperatures before the boat 32 is de-winterized,
    too much wave action,
    too much snow on the roof of the dock,
    the water level is too low and the lift 34 is going to ground out,
    a really dangerous storm is impending, and so on.
    Again, the electric sentry system 20:—
    continually monitors its sensors/information for conditions,
    has pre-defined triggers for a wide array of weather alerts,
    propagating a message containing the alert,
    stepping through a procedure to ensure receipt, and
    undertake any automatic action (if available).

For weather alerts, the system 20 is unlikely to have many automatic options available to it. But perhaps it has a few. The system 20 might be able to do the following if the boat 32 is lifted, not de-winterized, and equipped with an engine compartment heater. That is, if a cold front is forecast, the system 20 can automatically switch "ON" the engine compartment heater.

Otherwise, if the alert is something like, the lake level is dropping and the lift 34 is bound to ground out pretty soon, the owner really has one practical option. The owner or someone for the owner has to move the boat 32, either to a deeper part of the lake, or take it off on a trailer and so on.

The electric sentry system 20's detection of a conventional alarm event (ie., the cabin door being opened) can have it respond with not only a message propagated to the boat owner but also a central alarm monitoring station of a local security company. That way, the security company can send out a guard to investigate long before the boat owner is likely to be able to get to his or her boat 32.

It is another aspect of the invention that the electric sentry system 20 in accordance with the invention keeps logs (or records) of numerous things for some period of time, including:—
    an sent box or the like for all communications out;
    an inbox or the like for all communications in;
    to the extent possible, a GPS identifier for all communications in;
    data, images and/or video from all/most detector readings,
    itemization of every output of a control instruction sent, and so on.
    Someone can later audit the records and determine:—
    historical positions of the boat 32 and/or lift 34,
    every position change,
    a GPS history of from where incoming communications were sent,
    perhaps catch images of intruders like thieves or racoons, and so on.

Indeed, it is a preference for the invention that the electric sentry system 20 in accordance with the invention periodically compile reports of such history. If the system 20 is linked to Wi-Fi and/or an Internet connection, it can periodically upload the history to long-term storage elsewhere. Concurrent with that, the system 20 can periodically forward abbreviated reports to the boat owner/authorized user.

Figure 10:
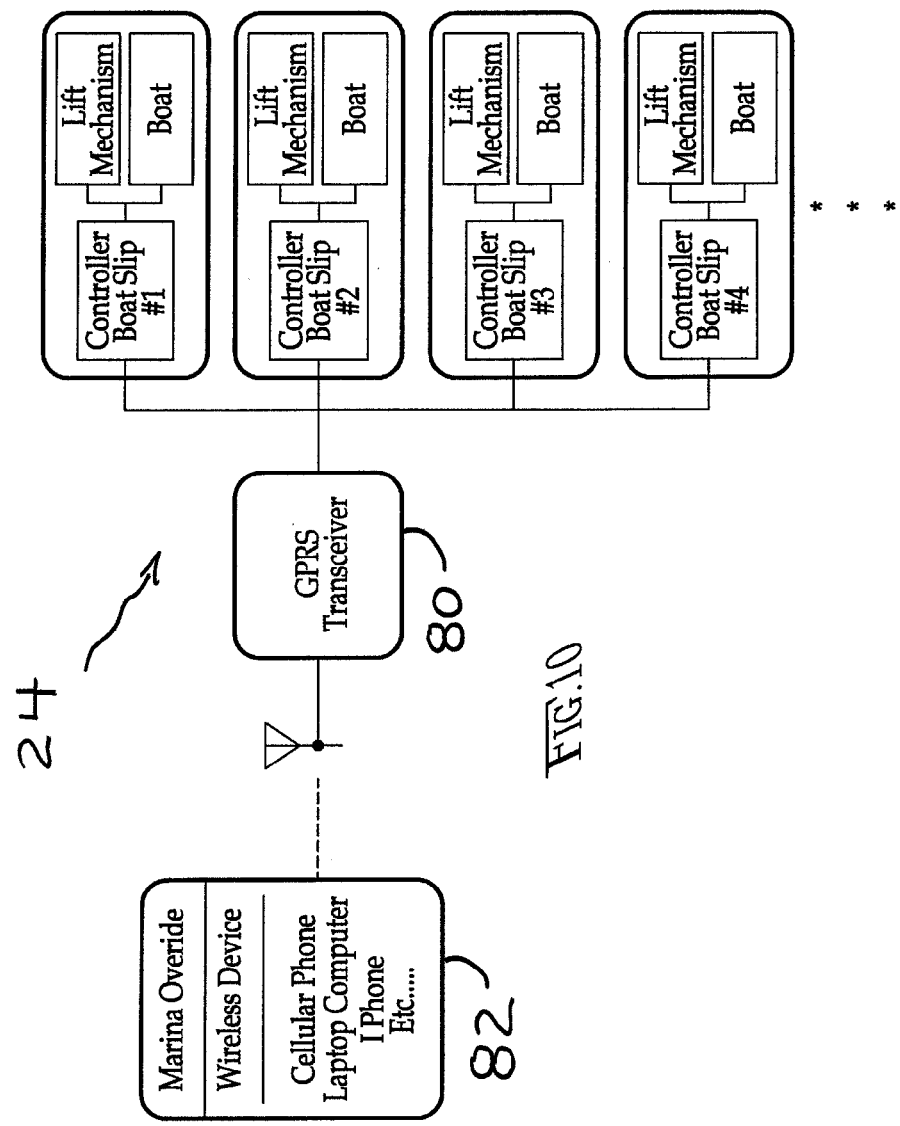
FIG. 10 is a block diagram comparable to FIG. 5 except showing a plurality of boat and lift control and security systems in accordance with the invention networked together such as where the relevant user is a marina owner.

FIG. 10 shows a networked configuration 24 of the electric sentry system 20 for a marina of docked boats in accordance with the invention.

In the networked configuration 24, the marina is equipped with an electric sentry system 20 along as many of slips that the marina owner desires. In this configuration 24, it makes sense to network all the individual electric sentry systems 20 by Wi-Fi or an internet connection to an administrative server 80. The administrative server 80, however, might ultimately send and receive communications with a mobile wireless device 82 marina owner or delegate(s) therefor over a cellular communications network.

Given the foregoing, this configuration 24 in FIG. 10 affords the marina owner with all the features described above, along with other such as the following. For example, this offers the marina owner to undertake monitoring of multiple lifts at the same time. This better allows the marina owner to manage a fleet of rental boats for renting to customers. This gives the marina a master-account type solution for him or her to monitor all the boat lifts and the performance thereof. If in a day a marina rents twenty to thirty boats, the marina owner (or delegate therefor) would like to know that all the boats were returned and, also, that all the hirelings remembered to get the boats up on each boat's lift. In other works, this configuration 24 gives the marina a quick check on his fleet at the end of a day.

Figure 11:
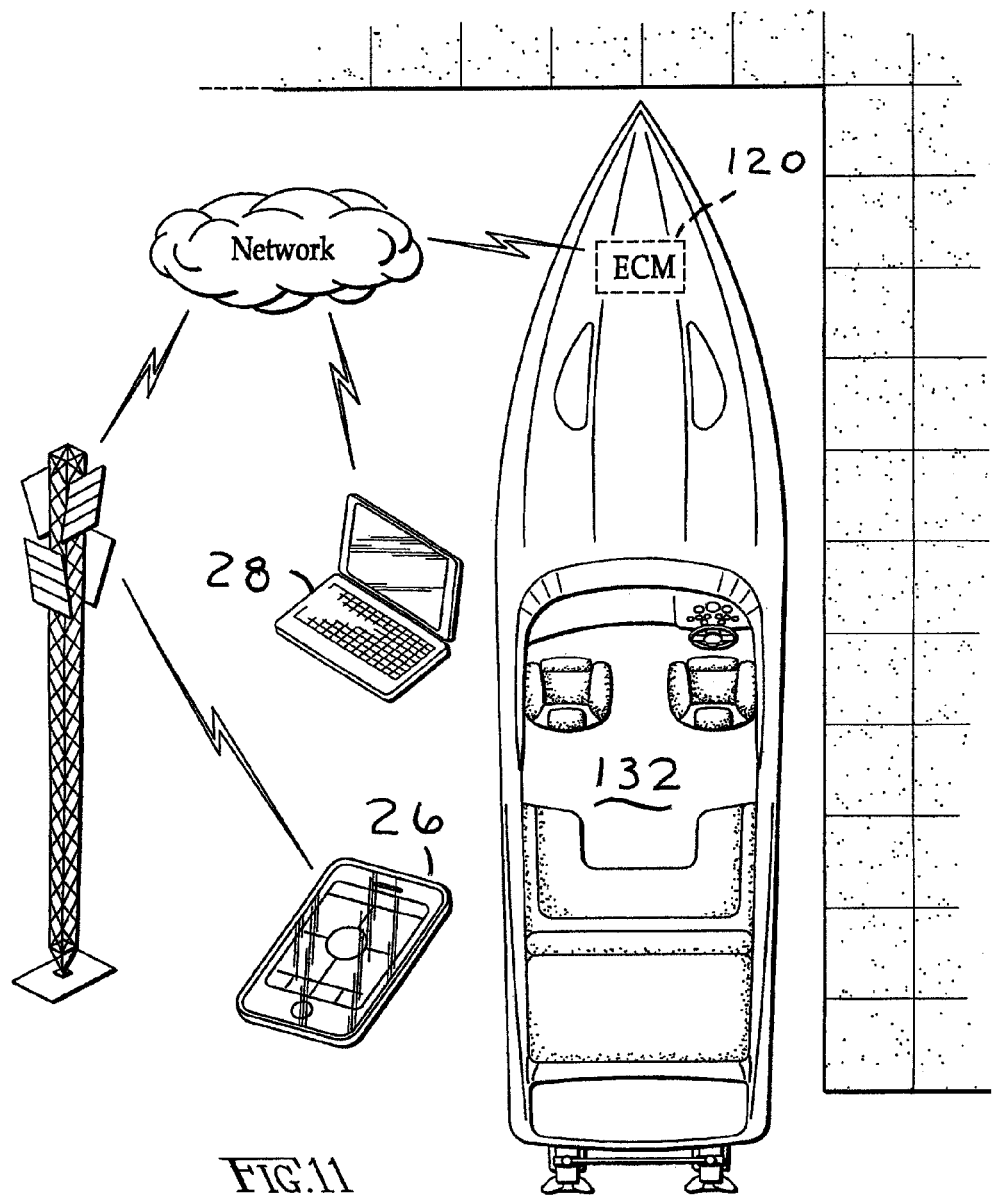
FIG. 11 is a plan view of docked boat provided with an alternate embodiment of an electronic sentry system therefor and in accordance with the invention.

FIG. 11 is a plan view of docked boat 132 provided with an alternate embodiment of an electronic sentry system 120 therefor and in accordance with the invention.

This electronic sentry system 120 is represented by the block labeled ECM for electronic control module. This sentry system/ECM is 120 is coupled into the boat 132's on-board diagnostic bus (OBD, or its code bus) or the counterpart therefor. By way of background, automobiles have had long-standing well-developed standards for such code buses. OBD II stands for Updated On-Board Diagnostics (code bus), which is a standard effective in cars sold in the U.S. after Jan. 1, 1996. CANBUS (also referred to as CANbus or CAN bus) is a network used in many every-day products consisting of multiple microcontrollers that need to communicate with each other. It is nowadays mandated for cars sold in the U.S., first having been accepted by European car manufacturers.

Nowadays boats, even outboard motors, have similar buses or ports to microcontrollers that can be linked into for diagnostic purposes and, in the cases for some devices, control too. It is an object of the invention to connect the sentry system/ECM 120 in accordance with the invention to the electronics of the boat 132.

Figure 12A:
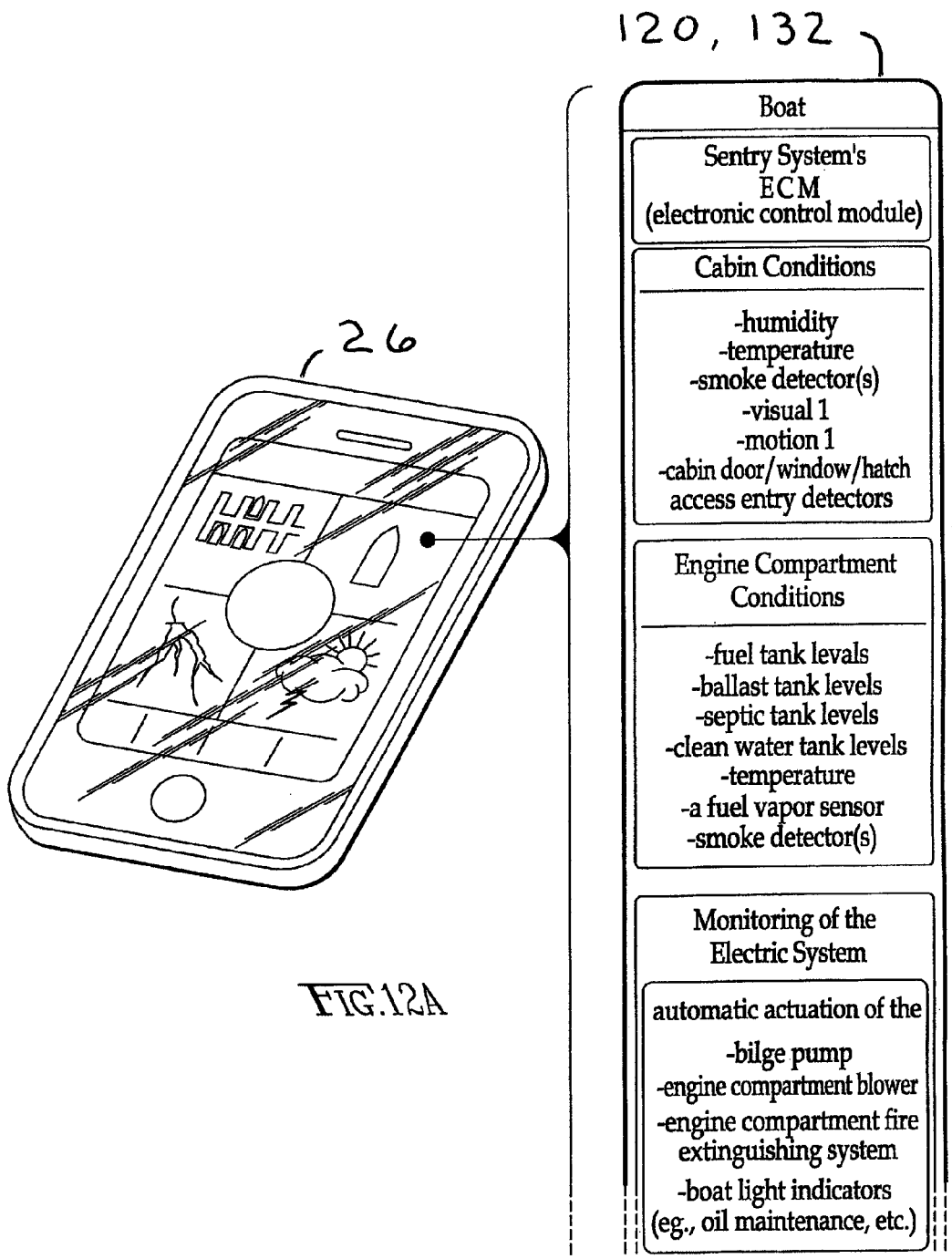
FIGS. 12a and 12b are a pair of companion views that tile together to form a block diagram comparable to FIGS. 7 through 9 except for the docked boat and electronic sentry system of FIG. 11.
Figure 12B:
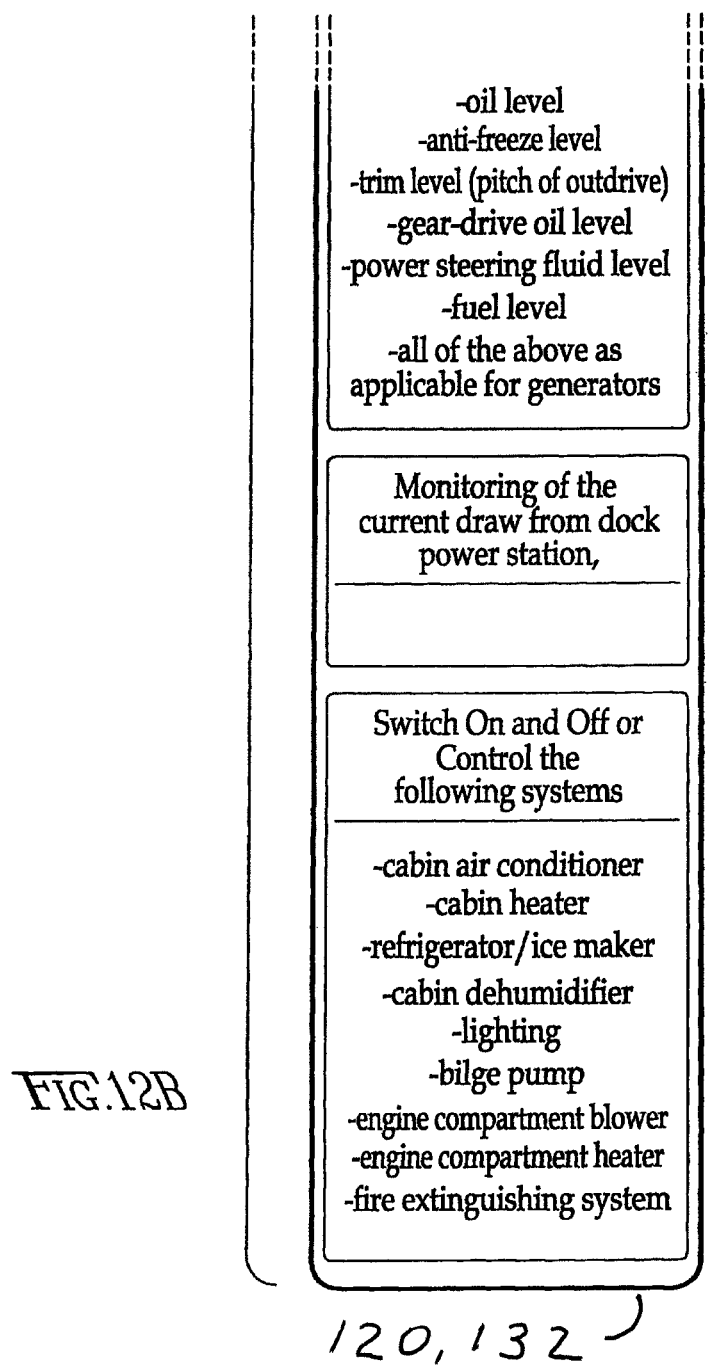

FIGS. 12a and 12b show in part that the sentry system/ECM 120 is preferably linked to the following detectors in connection with boat 132:—
for cabin conditions:
  humidity,
  temperature,
  smoke detector(s),
  visual 1 (eg., camera),
  motion 1 (eg., motion sensor),
  cabin door/window/hatch/access entry detectors, and so on.
for engine compartment conditions:
  fuel tank levels,
  ballast tank levels,
  septic tank levels,
  clean water tank levels,
  temperature,
  a fuel vapor sensor
  smoke detector(s),
  temperature,
  a fuel vapor sensor, and so on.
for monitoring the electric system or OBD/CANBUS counterpart:
  automatic actuation of the bilge pump,
  automatic actuation of the engine compartment blower,
  automatic actuation of the engine compartment fire extinguishing system,
  automatic actuation of boat light indicators (eg., oil maintenance, etc.)
  engine oil level
  anti-freeze level,
  trim level (pitch of outdrive),
  outdrive gear-drive oil level,
  power steering fluid level,
  and then all of the above as applicable for generators, including oil/fuel/fluid levels therefor, and so on.

FIGS. 12a and 12b show in part that the sentry system/ECM 120 is preferably linked to send control signals to the following devices in and around the boat 132 to switch them "ON" and "OFF" or otherwise operate them:—
  cabin air conditioner,
  cabin heater,
  refrigerator/ice maker,
  cabin dehumidifier,
  lighting,
  bilge pump,
  engine compartment blower,
  engine compartment heater,
  fire extinguishing system,
  trim level (eg., outdrive pitch), and so on.

It is a further object of the invention to monitor the power draw of the boat from the power pedestals (or power stations) installed on docks. Preferably the sentry system/ECM 120 monitors the current draw from the power pedestal, and records data as well as looks out for alarm events among such things as power usage, power surges, and so on.

If the power usage rises above a trigger, the sentry system/ECM 120 can send the mobile wireless device 26 an alarm message. In consequence, the user can respond back with instructions to shut down certain devices or, if the temperature set for the air conditioner is controllable, then setting the temperature to a higher value.

It is an aspect of the invention that communications and/or communications networks will optionally involve any of the following protocols. GPRS is the acronym for General Package Radio Services, a generational extension of GSM. EDGE or EGPRS is Enhanced GPRS. Internet communications are governed by HTTP (Hyper Text Transfer Protocol). Email is formatted according to SMTP (Simple Mail Transfer Protocol) and/or POP3 (Post Office Protocol). Text and/or multimedia messaging includes SMS (short messaging service) and MMS (Multimedia Messaging Service). Elevation and coordinates are determined by GPS (Global Positioning System). Additional formats concerning the communications include WCDMA (Wideband Code Division Multiple Access), HSPDA (High Speed Data Packet Access), and CSD (Circuit Switched Data)

In a broad sense and without limitation, the following comprise generalizations about the utility of the foregoing protocols/formats. It is preferred to use GPS and A-GPS to determine and communicate positioning data back to the user. In general, t is preferred to use GRPS/EDGE for most of the communication of the electronic sentry system. HSDPA, WCDMA and CSD can be as readily used in this service as well for data. However, SMTP and/or POP3 are available for email communications, and SMS and/or MMS for sending urgent notifications or warnings. It is preferred to use HTTP on the mobile user interface.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of utilizing an electronic sentry system proximate a docked boat for a remote user, comprising the steps of:
   docking a boat in a slip having a boat lift;
   configuring an electronic sentry system proximate the docked boat with operability to respond to communications sent from a cellular telephone of a remote user over a cellular telephone network;
   configuring an electronic operator of the boat lift and linking the electronic operator to the electronic sentry system such that the electronic sentry system can send control signals to the electronic operator and can change the status or state of the boat lift;
   linking a camera pointed at the slip to the electronic sentry system;
   said remote user querying the electronic sentry system from said remote user's cellular telephone for the status or state of the boat lift; and
   said electronic sentry system responding over the communications network with a response comprising both an indication of status or state of the boat lift, and, at least one current image from the camera.

2. The method of claim 1 wherein:
   the respective state or status of the boat lift comprises a present position of the boat lift;
   based on the indication from the electronic sentry system of the present position of the boat lift, said remote user sending over the remote user's cellular telephone an instruction to the electronic sentry system to change the present position of the boat lift; and
   the electronic sentry system outputting control signals to the electronic operator of the boat lift in accordance with the instruction.

3. The method of claim 1 wherein:
   the respective electronic operator comprises an electrically-operated air manifold.

4. A method of utilizing an electronic sentry system proximate a docked boat for a remote user, comprising the steps of:
   docking a boat in a slip;
   associating a chosen boat condition or system with either the boat or the slip, and which chosen boat condition or system has plural conditions or states that can be changed by an electronic operator therefor;
   configuring an electronic sentry system proximate the docked boat with operability to respond to communications sent from a cellular telephone of a remote user over a cellular telephone network;
   configuring the electronic operator of the chosen boat condition or system and linking the electronic operator to the electronic sentry system such that the electronic sentry system can send control signals to the electronic operator and change the condition or state of the chosen boat condition or system;
   said remote user querying the electronic sentry system with the remote user's cellular telephone for the condition or state of the chosen boat condition or system;
   said electronic sentry system responding to the remote user's cellular telephone with a response;
   if according to the response, said remote use want to change the condition or state of the chosen boat condition or system, said remote user sending an instruction from the remote user's cellular telephone and to the electronic sentry system to change such condition or state of the chosen boat condition or system; and
   the electronic sentry system outputting control signals to the electronic operator of the chosen boat condition or system in accordance with the instruction.

5. The method of claim 4 wherein:
   the chosen boat condition or system comprises a cabin air conditioner having "ON and "OFF" states.

6. The method of claim 5 further comprising:
   a second chosen boat condition or system comprising cabin air temperature, and the respective condition to be changed therefor comprises temperature setting for the cabin air conditioner.

7. The method of claim 4 wherein:
   the chosen boat condition or system comprises a refrigerator having "ON and "OFF" states.

8. The method of claim 4 wherein:
   the chosen boat condition or system comprises an engine compartment blower having "ON and "OFF" states.

9. The method of claim 4 wherein:
   the chosen boat condition or system comprises power usage management system, and the respective condition to be changed therefor comprises power usage of the boat drawn from a power pedestal or power station installed on the dock;
   said electronic sentry system periodically sampling the power usage management system;
   if the power usage exceeds a trigger level, said electronic sentry system propagating a message to the remote user's cellular telephone comprising an alarm message.

10. The method of claim 9 wherein:
    said power usage management system having a respective condition to be changed therefor comprising any of a change to a temperature setting for a cabin air conditioner and/or the switching "ON" or "OFF" various electronic devices.

11. A method of utilizing an electronic sentry system proximate a docked boat for a remote user, comprising the steps of:
    docking a boat in a slip;
    associating a position detector relative the boat and slip for associating boat position relative to the slip while docked;
    configuring an electronic sentry system proximate the docked boat with operability to propagate communications to a cellular telephone of a remote user over a cellular telephone network;
    linking the position detector to the electronic sentry system;
    said electronic sentry system periodically sampling the output of the position detector;
    configuring said electronic sentry system with a trigger event relative the output of the position detector;
    when said output of the position detector constitutes the trigger event, said electronic sentry system propagating an alarm signal of such to the remote user's cellular telephone.

12. The method of claim 11 further comprising:
    linking a camera pointed at the slip to the electronic sentry system;
    when said output of the position detector constitutes the trigger event, said electronic sentry system propagating a communication or communications to the remote user's cellular telephone comprising both an alarm signal of such, and, at least one current image from the camera.

13. The method of claim 11 further comprising:
    configuring the position detector with sufficient sensitivity to detect the rocking of waves; and configuring the electronic sentry system such that the trigger event corresponds to high waves.

14. The method of claim 11 further comprising:
configuring the position detector with sufficient sensitivity to detect the rocking due to a person entering the boat; and
configuring the electronic sentry system such that the trigger event corresponds to such rocking.

15. The method of claim 14 further comprising:
linking a camera pointed at the slip to the electronic sentry system;
when said output of the position detector constitutes the trigger event, said electronic sentry system propagating a communication or communications to the remote user's cellular telephone comprising both an alarm signal of such, and, at least one current image from the camera.

16. The method of claim 11 further comprising:
docking a boat in a slip with a boat lift;
mounting the position detector on the boat lift.

17. The method of claim 11 further comprising:
docking a boat in a slip with a boat lift;
mounting said position detector and another position detector and a third position detector on the boat lift;
linking said other position detector and said third position detector to the electronic sentry system;
said electronic sentry system periodically sampling the outputs of said position detector and said other position detector and said third position detector to detect if the boat lift is fully submerged, fully raised, some stage in between or askew;
configuring said electronic sentry system with plural trigger events relative the outputs of said position detector and said other position detector and said third position detector; and
when said outputs thereof constitute any of the trigger events, said electronic sentry system propagating an alarm signal of such to the remote user's cellular telephone.

18. The method of claim 17 further comprising:
linking a camera pointed at the slip to the electronic sentry system;
when said outputs of any or all of the position detectors constitutes any trigger event, said electronic sentry system propagating a communication or plural communications to the remote user's cellular telephone comprising both an alarm signal of such, and, at least one current image from the camera.

19. A method of utilizing an electronic sentry system proximate a docked boat for a remote user, comprising the steps of:
docking a boat in a slip having a boat lift;
configuring an electronic sentry system proximate the docked boat with operability to propagate messages to a cellular telephone of a remote user over a cellular telephone network;
configuring an electronic operator of the boat lift and linking the electronic operator to the electronic sentry system such that the electronic sentry system can send control signals to the electronic operator and can change the status or state of the boat lift;
the electronic sentry system periodically sampling (1) the status or state of at least one chosen condition of the docked boat and (2) data from at least one online source regarding some factor could prospectively impact the docked boat;
processing the sampled status or state of the chosen condition of the docked boat and the sampled data from the at least one online source for determining if an alert condition has been met; and
generating an alert communication and propagating the alert communication to the cellular telephone of the remote user.

20. The method of claim 19 further comprising:
mounting a depth locator on the boat lift and linking the depth locator to the electronic sentry system;
the electronic sentry system periodically sampling the depth locator such that the chosen boat condition comprises water depth under the dock;
the electronic sentry system periodically sampling an online source for a forecast of a rise and/or fall in the level of the waterway such that the factor from the online source comprises the forecast of a rise and/or fall in the level of the waterway; and
the alert condition comprises that the water levels are falling so low that the dock and/or boat are at risk of being marooned on the bed of the waterway.

* * * * *